United States Patent
Kim et al.

(10) Patent No.: US 9,479,068 B2
(45) Date of Patent: Oct. 25, 2016

(54) POWER SUPPLY DEVICE

(71) Applicant: SAMSUNG ELECTRO-MECHANICS CO., LTD., Suwon, Gyunggi-do (KR)

(72) Inventors: Don Sik Kim, Gyunggi-do (KR); Dong Jin Lee, Gyunggi-do (KR); Jae Cheol Ju, Gyunggi-do (KR); Jae Hak Lee, Gyunggi-do (KR); Hong Sun Park, Gyunggi-do (KR)

(73) Assignee: SOLUM CO., LTD, Suwon-Si, Gyeonggi-Do (KR)

( * ) Notice: Subject to any disclaimer, the term of this patent is extended or adjusted under 35 U.S.C. 154(b) by 455 days.

(21) Appl. No.: 14/033,426

(22) Filed: Sep. 20, 2013

(65) Prior Publication Data

US 2015/0003126 A1 Jan. 1, 2015

(30) Foreign Application Priority Data

Jun. 28, 2013 (KR) ........................ 10-2013-0076015

(51) Int. Cl.
*H02M 3/335* (2006.01)
*H02M 1/32* (2007.01)
*G06F 1/32* (2006.01)

(52) U.S. Cl.
CPC ........... *H02M 3/33523* (2013.01); *H02M 1/32* (2013.01); *G06F 1/32* (2013.01)

(58) Field of Classification Search
CPC .... H02M 1/36; H02M 3/33523; H02H 7/12; H02H 7/122; H02H 7/125; H02H 7/1257
USPC .............................. 713/323; 363/50
See application file for complete search history.

(56) References Cited

U.S. PATENT DOCUMENTS

| 2004/0032754 A1* | 2/2004 | Yang | H02M 1/32 363/56.09 |
|---|---|---|---|
| 2004/0080961 A1* | 4/2004 | Kim | H02H 7/1252 363/21.07 |
| 2007/0086223 A1* | 4/2007 | Uchida | H02M 1/32 363/52 |
| 2011/0305047 A1* | 12/2011 | Jungreis | H02M 1/08 363/21.02 |
| 2012/0050250 A1* | 3/2012 | Jung | H05B 33/0815 345/212 |
| 2013/0343103 A1* | 12/2013 | Takizawa | H02H 7/1203 363/53 |

FOREIGN PATENT DOCUMENTS

| JP | 05-030735 A | 2/1993 |
| JP | 2001-128466 A | 5/2001 |
| KR | 20-0156513 Y1 | 6/1999 |
| KR | 20-2009-0006146 U | 6/2009 |
| KR | 10-2012-0064383 A | 6/2012 |

OTHER PUBLICATIONS

Korean Office Action issued in Korean Application No. 10-2013-0076015 dated Jan. 23, 2015, with English Translation.
Korean Office Action issued in Korean Application No. 10-2013-0076015 dated Mar. 28, 2014, with English Translation.

* cited by examiner

*Primary Examiner* — Thomas Lee
*Assistant Examiner* — Aaron J Browne
(74) *Attorney, Agent, or Firm* — McDermott Will & Emery LLP

(57) ABSTRACT

There is provided a power supply device having a primary side on which a primary winding of a transformer is located and a secondary side on which a secondary winding of the transformer is located, and supplying power to a load, the device including: a photo coupler transmitting load short-circuit information from the secondary side to the primary side, a standby power supply terminal supplying power to the photo coupler; and a current passing unit connecting the photo coupler to the load.

16 Claims, 2 Drawing Sheets

POWER SUPPLY DEVICE

CROSS-REFERENCE TO RELATED APPLICATIONS

This application claims the priority of Korean Patent Application No. 10-2013-0076015 filed on Jun. 28, 2013, in the Korean Intellectual Property Office, the disclosure of which is incorporated herein by reference.

BACKGROUND OF THE INVENTION

1. Field of the Invention

The present invention relates to a power supply device, and more particularly, to a power supply device capable of quickly disconnecting a supply of power when a load is short-circuited.

2. Description of the Related Art

Recently, various electronic devices, meeting various user needs, have been variously implemented. These electronic devices may employ power supply devices supplying operating power thereto in order to achieve desired functions.

Typically, a power supply device may employ a switching mode power supply (SMPS) scheme, having advantages such as power conversion efficiency, miniaturization and the like.

Typically, a power supply device has a configuration for interrupting the supply of power when a load is short-circuited.

There are a variety of methods for interrupting a supply of power when a load is short-circuited. For example, there is a method in which a current sensing circuit is added to an output voltage loop and current flowing through the loop is sensed so that it may be determined that a short-circuit has occurred in output voltage if sensed current is above a predetermined value. In addition, there is a method in which current flowing through a switching element for transferring power is sensed, to interrupt the switching operation.

These methods operate separate protection circuits so that the protection circuits take certain actions.

However, there may be a delay until the protection circuits operate, and additional components are required, which become an obstacle for high-density design. Further, such protection circuits may cause design costs to be increased.

Patent Document 1 discloses a device for protection against shorts in switching power, and Patent Document 2 discloses a safety device for preventing shorts. However, the Documents do not disclose rapidly protecting a power supply device when a load is short circuited.

Related Art Documents (Patent Document 1) Japanese Patent Laid-Open Publication No. 1993-030735
(Patent Document 2) Korean Utility Model Laid-Open Publication No. 2009-0006146

SUMMARY OF THE INVENTION

An aspect of the present invention provides a power supply device capable of quickly interrupting a supply of power when a load connected to the power supply device is short-circuited.

According to an aspect of the present invention, there is provided a power supply device having a primary side on which a primary winding of a transformer is located and a secondary side on which a secondary winding of the transformer is located, and supplying power to a load, the device including: a photo coupler transmitting load short-circuit information from the secondary side to the primary side, a standby power supply unit supplying power to the photo coupler; and a current passing unit connecting the photo coupler to the load.

The photo coupler may include a light emitting diode located on the secondary side of the power supply device, and a photo transistor located on the primary side of the power supply device.

The anode of the light emitting diode may be connected to the standby power supply unit, and the cathode of the light emitting diode may be connected to the current passing unit.

The current passing unit may include a passing diode.

The anode of the passing diode may be connected to the cathode of the light emitting diode, and the cathode of the passing diode may be connected to the load.

The device may further include a control unit interrupting the operation of the power supply device based on the operation of the photo coupler.

The device may further include a control unit interrupting the operation of the power supply device when the photo transistor is operated.

Current may flow from the standby power supply unit to the current passing unit via the photo coupler if the load is short-circuited.

Current may flow from the standby power supply unit to the passing diode via the light emitting diode if the load is short-circuited.

According to another aspect of the present invention, there is provided a power supply device including: a photo coupler having a light emitting diode located on a secondary side of the power supply device and a photo transistor located on a primary side of the power supply device; a standby power supply terminal connected to the anode of the light emitting diode; and a passing diode connected to the cathode of the light emitting diode, wherein the cathode of the passing diode is connected to a load, and current flows from the standby power supply terminal to the passing diode via the light emitting diode if the load is short-circuited.

The device may interrupt the operation of the power supply device based on the operation of the photo coupler.

The device may interrupt the operation of the power supply device when the photo transistor is operated.

According to another aspect of the present invention, there is provided a power supply device including: a power rectifying unit rectifying alternating current power; a switching unit switching the rectified power; a transformer having a primary winding and a secondary winding magnetically coupled to the primary winding, and transforming the switched power according to a predetermined turns ratios; a rectifying unit rectifying the transformed power so as to supply the resulting power to a load; a control unit controlling the switching of the switching unit; a photo coupler transmitting load short-circuit information to the control unit; a standby power supply terminal supplying power to the photo coupler; and a current passing unit connecting the photo coupler to the load.

The photo coupler may include a light emitting diode located on the secondary side of the power supply device, and a photo transistor located on the primary side of the power supply device.

The anode of the light emitting diode may be connected to the standby power supply unit, and the cathode of the light emitting diode may be connected to the current passing unit.

The current passing unit may include a passing diode.

The anode of the passing diode may be connected to the cathode of the light emitting diode, and the cathode of the passing diode may be connected to the load.

The device may further include a control unit interrupting the operation of the power supply device based on the operation of the photo coupler.

The device may further include a control unit interrupting the operation of the power supply device when the photo transistor is operated.

Current may flow from the standby power supply unit to the current passing unit via the photo coupler if the load is short-circuited.

Current may flow from the standby power supply unit to the passing diode via the light emitting diode if the load is short-circuited.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
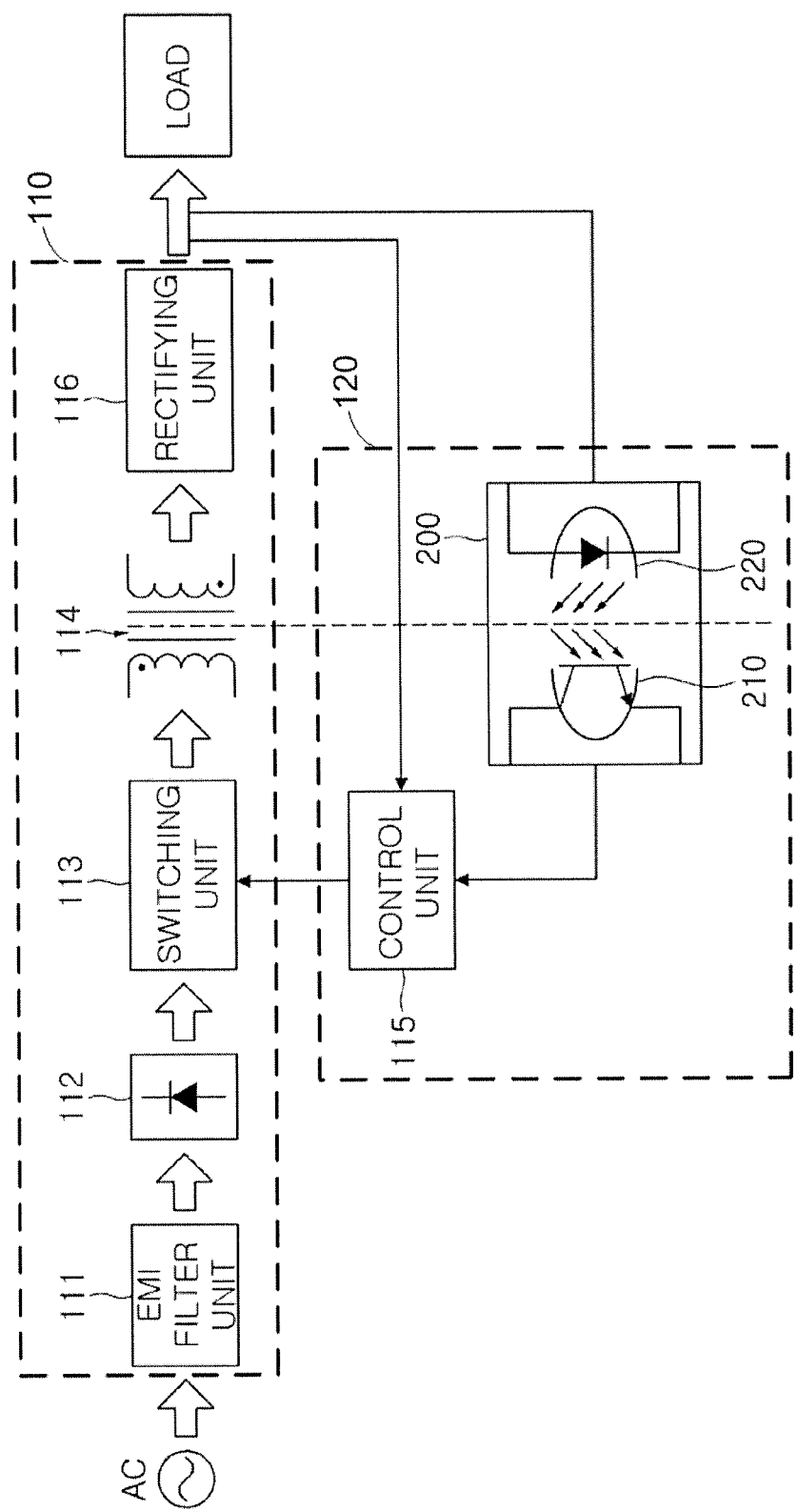
FIG. 1 is a block diagram of a power supply device according to an embodiment of the present invention.

Hereinafter, embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Throughout the drawings, the same or like reference numerals will be used to designate the same or like elements.

As will be appreciated by those skilled in the art to which the present invention pertains, the power supply device described in the specification may be applied to all kinds of isolated converters, such as a flyback converter, a half-bridge converter and a full-bridge converter.

FIG. 1 is a block diagram of a power supply device according to an embodiment of the present invention.

Referring to FIG. 1, the power supply device 100 according to an embodiment of the present invention may include a power supply unit 110 and a power supply control unit 120.

The power supply unit 110 may include an EMI filter unit 111, a power rectifying unit 112, a switching unit 113, a transformer 114, and a rectifying unit 116.

As will be appreciated by those skilled in the art, the power supply unit 110 is not limited to that shown in FIG. 1, but may be implemented as an isolated converter such as a flyback converter, half-bridge converter, or a full-bridge converter, known in the art.

The EMI filter unit 111 may filter electromagnetic interference (EMI) included in alternating current (AC) power.

The power rectifying unit 112 may include a bridge diode and the like to rectify the filtered AC power.

The switching unit 113 may include at least one switch to switch the rectified power.

The transformer 114 may include a primary winding and a secondary winding magnetically coupled to the primary winding. The primary winding of transformer 114 may receive the switched power, and the secondary winding may have a predetermined turns ratio with the primary winding so as to transform voltage level of the power input to the primary winding, to output the transformed voltage level.

The rectifying unit 116 may rectify the power output from the secondary winding so as to output driving power having predetermined voltage level. The driving power may be transferred to a load.

The power supply control unit 120 may include a control unit 115 and a photo coupler 200.

The control unit 115 may control the switching of the switching unit 113.

For example, the control unit 115 may control the switching of the switching unit 113 based on a feedback signal from the secondary side. The feedback signal may contain information regarding voltage and current supplied to the load.

The control unit 115 may interrupt the operation of the power supply device based on the operation of the photo coupler 200. Specifically, the control unit 115 may acquire information regarding short-circuits of the load connected to the power supply device based on the operation of the photo coupler 200. Here, the control unit 115 may interrupt the operation of the switching unit 113. That is, the control unit 115 may interrupt the switching operation for transferring power.

In addition, the control unit 115 may interrupt the operation of the power supply device based on the operation of a photo transistor 210 provided in the photo coupler 200. Specifically, the control unit 115 may acquire information regarding short-circuits of the load connected to the power supply device based on the operation of the photo transistor 210 included in the photo coupler 200.

The information regarding short-circuit of the load may refer to a signal indicating that a short-circuit has been detected in the load.

Again, the control unit 115 may interrupt the operation of the switching for transferring the power by interrupting the operation of the switching unit 113.

The photo coupler 200 may be operated when the load is short-circuited. For example, when the load is short-circuited, the photo coupler 200 may transfer the information regarding the short-circuit of the load to the control unit 115.

The photo coupler 200 may include a light emitting diode 220 located on the secondary side of the power supply device, and a photo transistor 210 located on the primary side of the power supply device.

In the following, the arrangement of the photo coupler 200 in the power supply device will be described with reference to FIG. 2.

Figure 2:
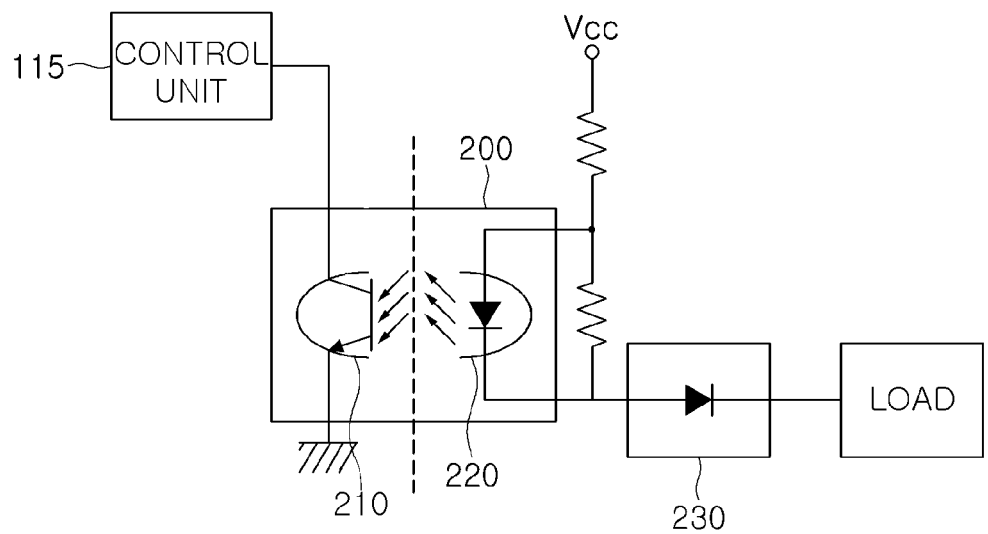
FIG. 2 is a diagram showing line connections of a photo coupler in a power supplying unit according to an embodiment of the present invention.

FIG. 2 is a diagram showing line connections of a photo coupler in a power supplying unit according to an embodiment of the present invention.

Referring to FIG. 2, the photo coupler 200 may include a light emitting diode 220 located on the secondary side of the power supply device, and a photo transistor 210 located on the primary side of the power supply device.

The photo coupler 200 may be connected to a standby supply voltage Vcc terminal. In an embodiment, the standby supply voltage Vcc terminal may be powered from a standby power supply. The standby supply voltage Vcc terminal may power the photo coupler 200.

Specifically, the standby supply voltage Vcc terminal may apply a predetermined voltage to the light emitting diode 220.

Further, the anode of the light emitting diode 220 may be connected to the standby supply voltage Vcc terminal.

Further, the cathode of the light emitting diode 220 may be connected to a current passing unit 230.

The current passing unit 230 may connect the photo coupler 200 to the load. Specifically, the current passing unit 230 may connect the light emitting diode 220 to the load.

The current passing unit 230 may pass current between the light emitting diode 220 and the load.

Specifically, the current passing unit 230 may include a diode. For the sake of convenience, the diode used in the current passing unit 230 is referred to as a passing diode.

Referring to FIG. 2, the anode of the passing diode may be connected to the cathode of the light emitting diode. Additionally, the cathode of the passing diode may be connected to the load.

In the following, referring to FIG. 3, the operation of the photo coupler when the load is sort-circuited will be described in detail.

Figure 3:
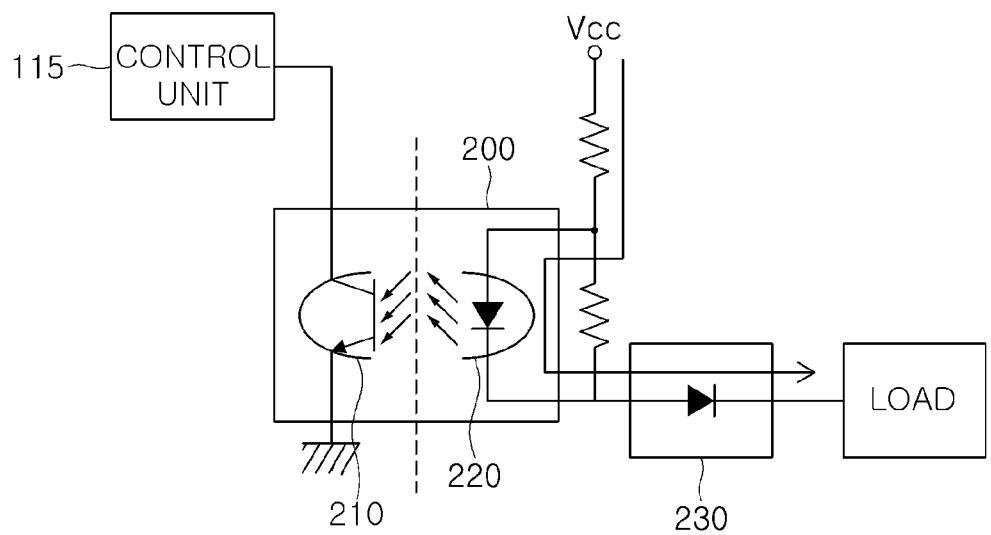
FIG. 3 is a diagram showing current flow passing through the photo coupler when a load is short-circuited.

FIG. 3 shows current flows passing through the photo coupler 200 when the load is short-circuited.

Referring to FIG. 3, when the load is short-circuited, currents flow from the standby supply voltage Vcc terminal to the current passing unit 230 via the photo coupler 200. Specifically, current may flow from the standby supply voltage Vcc terminal to the passing diode via the light emitting diode 220.

By the connections among the standby supply voltage Vcc terminal, the photo coupler 200, the current passing unit 230 and the load according to the embodiment of the present invention, as soon as a load is short-circuited, a current pass shown in FIG. 3 may be completed rapidly.

At this time, the light emitting diode in the photo coupler 200 emits light. The photo transistor 210 collects the light so as to be operated. Upon the operation of the photo transistor 210, the control unit 115 may rapidly acquire information regarding the short-circuit of the load.

When the control unit 115 acquires the information regarding the short-circuit of the load, the control unit 115 may interrupt the operation of the switching unit 113.

The power supply device according to the embodiment of the present invention need not include a separate protection circuit, such that design cost of the power supply device can be reduced. That is, according to the embodiment of the present invention, the power supply device can transfer the information regarding the short-circuit of a load by simply using the diode used in the current passing unit.

Moreover, according to the embodiment of the present invention, the power supply device can acquire the information regarding the sort-circuit of a load with simple configuration, such that high-density design can be achieved.

In the related art, a power supply device employs protection circuits for protecting circuits from short-circuits so that it takes time to operate the protection circuit. In contrast, in the power supply device according to an embodiment of the present invention, when a load is short-circuited, a current pass can be rapidly formed so that the photo coupler 200 can be operated, as shown in FIG. 3. That is, according to the embodiment of the present invention, the power supply device can quickly acquire the information regarding the sort-circuit of a load when a load is short-circuited. Then, the power supply device can quickly interrupt the supply of power.

As set forth above, according to embodiments of the present invention, a power supply device can quickly interrupting a supply of power when a load connected to the power supply device is short-circuited.

While the present invention has been shown and described in connection with the embodiments, it will be apparent to those skilled in the art that modifications and variations can be made without departing from the spirit and scope of the invention as defined by the appended claims.

What is claimed is:

1. A power supply device having a primary side on which a primary winding of a transformer is located and a secondary side on which a secondary winding of the transformer is located, and supplying power to a load, the device comprising:
    a photo coupler transmitting load short-circuit information from the secondary side to the primary side;
    a standby power supply unit supplying power to the photo coupler;
    a current passing unit connecting the photo coupler to the load; and
    a control unit interrupting operation of the power supply device based on operation of the photo coupler,
    wherein current flows from the standby power supply unit to the current passing unit via the photo coupler if the load is short-circuited.

2. The device of claim 1, wherein the photo coupler includes:
    a light emitting diode located on the secondary side of the power supply device; and
    a photo transistor located on the primary side of the power supply device.

3. The device of claim 2, wherein an anode of the light emitting diode is connected to the standby power supply unit, and a cathode of the light emitting diode is connected to the current passing unit.

4. The device of claim 3, wherein the current passing unit includes a passing diode.

5. The device of claim 4, wherein an anode of the passing diode is connected to the cathode of the light emitting diode, and a cathode of the passing diode is connected to the load.

6. The device of claim 2, wherein the control unit interrupts the operation of the power supply device if the photo transistor is operated.

7. The device of claim 4, wherein current flows from the standby power supply unit to the passing diode via the light emitting diode if the load is short-circuited.

8. A power supply device comprising:
    a photo coupler having a light emitting diode located on a secondary side of the power supply device and a photo transistor located on a primary side of the power supply device;
    a standby power supply unit connected to an anode of the light emitting diode;
    a passing diode connected to a cathode of the light emitting diode, wherein a cathode of the passing diode is connected to a load, and current flows from the standby power supply unit to the passing diode via the light emitting diode if the load is short-circuited; and
    a control unit interrupting operation of the power supply device based on operation of the photo coupler.

9. The device of claim 8, wherein the control unit interrupts the operation of the power supply device if the photo transistor is operated.

10. A power supply device, comprising:
    a power rectifying unit rectifying alternating current power;

a switching unit switching the rectified power;

a transformer having a primary winding and a secondary winding magnetically coupled to the primary winding, and transforming the switched power according to a predetermined turns ratios;

a rectifying unit rectifying the transformed power so as to supply the resulting power to a load;

a control unit controlling switching of the switching unit;

a photo coupler transmitting load short-circuit information to the control unit;

a standby power supply unit supplying power to the photo coupler;

a current passing unit connecting the photo coupler to the load; and a control unit interrupting operation of the power supply device based on operation of the photo coupler, wherein current flows from the standby power supply unit to the current passing unit via the photo coupler if the load is short-circuited.

11. The device of claim 10, wherein the photo coupler includes:

a light emitting diode located on a secondary side of the power supply device; and a photo transistor located on a primary side of the power supply device.

12. The device of claim 11, wherein an anode of the light emitting diode is connected to the standby power supply unit, and a cathode of the light emitting diode is connected to the current passing unit.

13. The device of claim 12, wherein the current passing unit includes a passing diode.

14. The device of claim 13, wherein an anode of the passing diode is connected to the cathode of the light emitting diode, and a cathode of the passing diode is connected to the load.

15. The device of claim 11, wherein the control unit interrupts the operation of the power supply device if the photo transistor is operated.

16. The device of claim 13, wherein current flows from the standby power supply unit to the passing diode via the light emitting diode if the load is short-circuited.

* * * * *